US008165040B2

(12) United States Patent
Yang et al.

(10) Patent No.: US 8,165,040 B2
(45) Date of Patent: Apr. 24, 2012

(54) METHOD FOR ROUTING MOBILE NODE IN WIRELESS MESH NETWORK AND A COMMUNICATION SYSTEM THEREOF

(75) Inventors: Chao Yang, Shenzhen (CN); Jianfeng Ma, Shenzhen (CN); Zhonghui Yao, Shenzhen (CN); Chunjie Cao, Shenzhen (CN); Fan Zhang, Shenzhen (CN); Weidong Yang, Shenzhen (CN); Wei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1022 days.

(21) Appl. No.: 12/110,870

(22) Filed: Apr. 28, 2008

(65) Prior Publication Data

US 2008/0259788 A1 Oct. 23, 2008

Related U.S. Application Data (63) Continuation of application No. PCT/CN2006/002534, filed on Sep. 26, 2006.

(30) Foreign Application Priority Data

Oct. 28, 2005 (CN) .......................... 2005 1 0100871

(51) Int. Cl.
*H04L 5/04* (2006.01)
(52) U.S. Cl. ........................................ 370/255; 370/406
(58) Field of Classification Search .................. 370/255, 370/256, 351, 406, 331, 277
See application file for complete search history.

(56) References Cited

U.S. PATENT DOCUMENTS

| 6,904,466 | B1 | 6/2005 | Ishiyama et al. |
| 7,697,504 | B2 * | 4/2010 | Chari et al. .................... 370/351 |
| 7,701,858 | B2 * | 4/2010 | Werb et al. ..................... 370/241 |
| 2002/0055971 | A1 | 5/2002 | Shahrier |
| 2002/0154613 | A1 * | 10/2002 | Shahrier ........................ 370/331 |
| 2002/0154638 | A1 | 10/2002 | Shahrier et al. |
| 2007/0165515 | A1 * | 7/2007 | Vasseur ......................... 370/216 |
| 2007/0177530 | A1 * | 8/2007 | Ando et al. ..................... 370/277 |
| 2007/0280165 | A1 * | 12/2007 | Doshi et al. .................... 370/331 |
| 2010/0125749 | A1 * | 5/2010 | Tanaka et al. ..................... 714/4 |

FOREIGN PATENT DOCUMENTS

| CN | 1511404 A | 7/2004 |
| JP | 2004274652 A | 9/2004 |

OTHER PUBLICATIONS

International Search Report for International Application No. PCT/CN2006/002534, dated Sep. 26, 2006. with English translation.

* cited by examiner

*Primary Examiner* — Kevin C Harper
*Assistant Examiner* — Henry Baron
(74) *Attorney, Agent, or Firm* — Conley Rose, P.C.; Grant Rodolph (57) ABSTRACT

A wireless mesh network includes several mesh networks and the wireless mesh network access points to which the mesh networks belong. A method establishing backbone routing and network tolopogy among each wireless mesh network access points, selecting one said wireless mesh network access point as a location inquiry sever for all the mesh networks, and acquiring the corresponding relations between all the mesh networks in the wireless mesh network and the wireless mesh network access points to which the mesh networks belong. When said mesh network needs to transmit data, the access point inquires the location inquiry server for the wireless mesh network access point which the destination mesh network belongs to, and performs routing based on the network topology.

17 Claims, 7 Drawing Sheets

METHOD FOR ROUTING MOBILE NODE IN WIRELESS MESH NETWORK AND A COMMUNICATION SYSTEM THEREOF

CROSS-REFERENCE TO RELATED APPLICATIONS

This application is a continuation of International Application No. PCT/CN2006/002534, filed Sep. 26, 2006. This application claims the benefit of Chinese Application No. 200510100871.1 filed Oct. 28, 2005. The disclosures of the above applications are incorporated herein by reference.

FIELD

The present disclosure relates to wireless communications, and to routing mobile nodes in a wireless mesh network and a communication system.

BACKGROUND

The statements in this section merely provide background information related to the present disclosure and may not constitute prior art.

With the development of wireless network techniques, various 802.11x standards are continuously updated, and new wireless network architectures and techniques are continuously proposed. One new network is a wireless mesh network. The wireless mesh network may be referred to as a "multi-hop" network, which is a new wireless network technique that differs significantly from the conventional wireless network. In a conventional wireless local-area network, since each client accesses the network via a wireless link connected with an Access Point (AP) of the wireless local-area network. Communications between subscribers must be performed via APs. Such a network and supporting architecture is called an infrastructure wireless network. However, in the wireless mesh network, each wireless device node can concurrently serve as an AP and a router. Each node can transmit and receive data and directly communicate with one or more peer nodes. This combines the advantages of the conventional Wireless Local-area Network (WLAN) and that of the Ad-hoc network to provide a wireless network with a high data rate and a wide coverage area.

Figure 1:
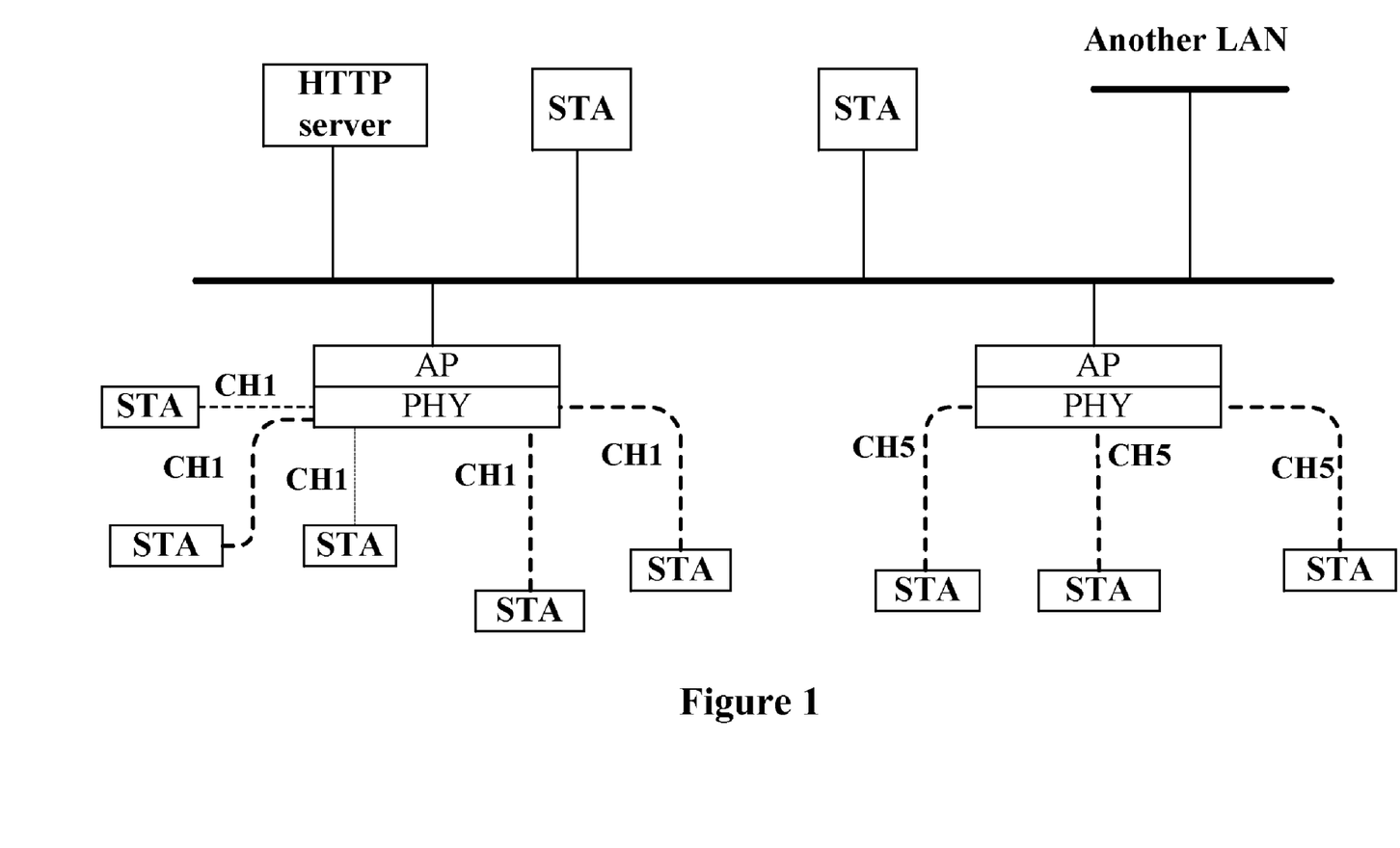
FIG. 1 is a schematic illustrating the topology structure of WLAN in the prior art.

FIG. 1 is a schematic diagram illustrating the topology structure of the WLAN in the prior art. Each Access Point (AP) of the WLAN has only one physical interface (PHY), and the AP is connected with an HTTP server, device nodes (STAs) in other local area networks, and other local area networks, etc. in a wired manner. The connections with other LANs are implemented via wired, distributed systems. Each AP accessing the WLAN is connected with the respective mobile nodes via different channels of its physical interface (PHY) by adopting existing wireless connections, such as using 802.11 standard. Different APs use different channels, such as the channels CH1 and CH5 as shown in FIG. 1. In FIG. 1, the DS Links are denoted by thick solid lines, the conventional 802.11 BSS Link wireless connections are denoted by dashed lines, and the conventional 802.x Link wired connections are denoted by thin solid lines.

Compared with the conventional switch network, the wireless mesh network is a new network architecture based on multi-hop routing and peer-to-peer network techniques, with the characteristic of mobile wide band. The wireless mesh network can be dynamically and continuously extended. In addition, the wireless mesh network has characteristics of self-organizing, self-managing, and self-healing. The wireless mesh network also has the redundancy mechanism and multi-path routing functions provided by the distributed network. In the wireless mesh network, the nodes can automatically join or move out of the network. The network can automatically discover the changes of network topology structure and compute another optimal multi-hop routing according to the changes. Therefore, the routing technique becomes a critical technique in the mesh network.

The Simple Efficient Extensible Mesh (SEE-Mesh) network provides a hybrid routing protocol for the wireless mesh network (HWMP, Hybrid Wireless Mesh Protocol), which combines the advantages of on-demand routing and proactive routing to provide flexible routing service for nodes in the mesh network. The routing protocol is based on the Ad-hoc on-demand routing Ad-hoc On-demand Distance Vector (AODV) and the tree-based proactive routing Tree-Based Routing Protocol (TBRP).

According to the routing protocol, if no Mesh Access Point (MAP) has a gateway (portal) to connect with an external network, all the nodes in the mesh network determine data transmission paths via the AODV routing protocol.

When an STA needs to transmit data, a path query message based on the on-demand routing is broadcasted immediately. The request is sent to a destination STA by multi-hop broadcasting of neighbor nodes. The destination STA selects an optimal route to send a response to the source STA. In this case, a data transmission link is established. The source STA sends a path query request message at a regular time interval to maintain the dynamically established routing path until the data transmission is finished.

If a Mesh Access Point MAP has a gateway (portal) to connect with an external network, the MAP can be determined as the "root" of a Tree-based routing protocol. The "root" node MAP maintains a routing tree according to the proactive routing algorithm, and each of the other nodes gets its parent node via the AODV routing protocol and maintains a routing path to the "root" node MAP. When an STA needs to transmit data, the data is first transmitted to the "root" node MAP via the proactive Tree-based routing protocol, and the "root" node MAP forwards the data to the destination STA according to its maintained routing table, and then the destination node continues the data transmission via the routing path to the source node for subsequent data transmission.

If the mesh network has no gateway (portal) for communication with an external network, the routing protocol completely depends on the on-demand routing mechanism of AODV (Ad-hoc On-demand Protocol). However, the AODV is dedicatedly designed for the Ad-hoc network and not optimized for the characteristics of the mesh network, and the path query messages of AODV will lead to a broadcast storm in the whole mesh network so that substantive network bandwidth may be occupied. Therefore, the operating efficiency of the routing protocol in the mesh network is low.

Also, because of the network broadcast storm, the routing protocol can not meet the requirements of multiple Quality of Service (QoS). Further, since a significant portion of the of broadcast storm for the AODV routing protocol occurs during the routing request, the increase of the number of nodes in the mesh network is limited, which therefore reduces the extensibility of the mesh network.

Since AODV is based on on-demand routing, the protocol has to maintain every link for data transmission. Since the rapid movement of nodes results in frequent handover between the wireless mesh access points (MAPs), the maintenance results in a large overhead and a long delay for data transmission, thereby making the protocol not be well adapted to rapid MAP handover.

If the Tree-based Proactive Routing Protocol is applied, the "root" node MAP is responsible for the establishment and maintenance of the routing trees in the whole network, which brings the problems of bottleneck and single-point failure. Therefore, the implementing method and operation process for the hybrid routing protocol are very complex, which affects the simplicity and convenience of the routing protocol in the mesh network.

SUMMARY

A routing method and communication system for the Client Station in a wireless Mesh network which can provide flexible routing service for the Client Station in Mesh network by combining the advantages of on-demand routing and pro-active routing. This improves the efficiency of the routing protocol and the extensibility of a Mesh network, makes itself well adapted to quick MAP handover, and improves the availability of the routing protocol.

A method for routing a mobile node in a wireless mesh network includes:

establishing backbone routes and a network topology between mesh access points;

selecting one of the mesh access points as a location query server for all of the mobile nodes, and getting the corresponding relations between all of the mobile nodes and the mesh access points serving the mobile nodes in the wireless mesh network;

querying, by the access point, in the location query server for the mesh access point corresponding to the destination mobile node, and performing routing according to the network topology structure, if a mobile node needs to transmit data.

A backup location query server is set, and location tables are set respectively in a primary location query server and the backup location query server, for storing the corresponding relations between all of the mobile nodes and the mesh access points serving the mobile nodes.

The method includes: performing the location query by the backup location query server, and re-determining a new backup location query server from the mesh access points, if the primary location query server fails.

The method further includes: notifying, by the mesh access point which first receives no query response from the primary location query server and the backup location query server within a predetermined time, the failures of the location query server and the backup location query server of the whole network, and initiating a request for re-selecting a query server, if both the primary location query server and the backup location query server fail.

The primary and backup location query servers are the mesh access points with the minimum and secondary minimum media access control addresses in the network respectively.

The primary and backup location query servers are mesh access points in a fixed sequence.

The method includes: performing, by the mesh access point, query and updating in the location query server, if the movement of the mobile node results in the inconsistence of location relation;

querying actively, the location query server, for the latest corresponding relation of the mobile node in each mesh access point, if the failure of the mobile node results in the inconsistence of location relation;

performing query and updating in the corresponding location query server, by the handover-to mesh access point.

The method includes: deregistering the corresponding relation between itself and the mobile node with the location query server by the original mesh access point, after the mobile node completely moves out of the coverage area of the original mesh access point;

after the mobile node moves into the coverage area of another mesh access point, registering the corresponding relation between itself and the mobile station with the location query server by the moved-to mesh access point.

The mobile node is connected with two mesh access points concurrently, if the mobile node belongs to the two mesh access points.

The method further includes:

notifying, by the original mesh access point, the handover-to mesh access point of the original destination mesh access point of the transmitted data, if the mobile node is transmitting data;

notifying, by the original mesh access point, the handover-to mesh access point of the mesh access point acting as the source of the received data, if the mobile node is receiving data.

The corresponding location query server queries actively the corresponding relation between the respective mesh access points and their corresponding mobile nodes in case of inconsistency of the location relation of the mobile node.

Further a wireless mesh communication system includes mobile nodes and access points connected wirelessly, and the respective mesh access points operate a routing protocol to establish required routes, the system including: at least one physical interface; and a location query server, adapted for storing the corresponding relations between all of the mobile nodes and mesh access points serving the mobile nodes in the wireless mesh network, the corresponding relations used to route query when the mobile nodes transmit data.

The location query server is one of the mesh access points.

Each of the mesh access points is provided with two physical interfaces, and is connected with the mobile nodes which belongs to the mesh access point or a neighbor mesh access point via different channels.

As described above, in the method for routing a mobile node in a wireless mesh network and the communication system the technique of combining centralized and distributed routing ideas on the basis of the special architecture of the mesh network is utilized, to enhance the extensibility of the protocol in the mesh network, to improve the efficiency of the routing protocol in the mesh network, and to provide a redundancy protection for the protocol, the routing method can be adaptive in case of rapid STA movement and frequent handover between MAPs, so that high availability of the routing protocol may be maintained.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The various embodiments are described in detail with reference to the attached drawings.

The present teachings combine the distributed and the centralized routing ideas. Generally, firstly, a general routing protocol, such as RIPv2 protocol, runs in the Mesh Access Points (MAPs) of the wireless mesh network to complete the establishment of backbone routes and network topology. Secondly, one of the MAPs is selected for serving as the location query server for the mobile nodes (STAs), and the corresponding relations between all of the STAs and the MAPs serving all of the STAs. When needing to transmit data, an STA queries in the location query server, via the MAP serving the STA, for the MAP serving the destination STA, and a routing is performed according to the previously-established topology structure.

Figure 2:
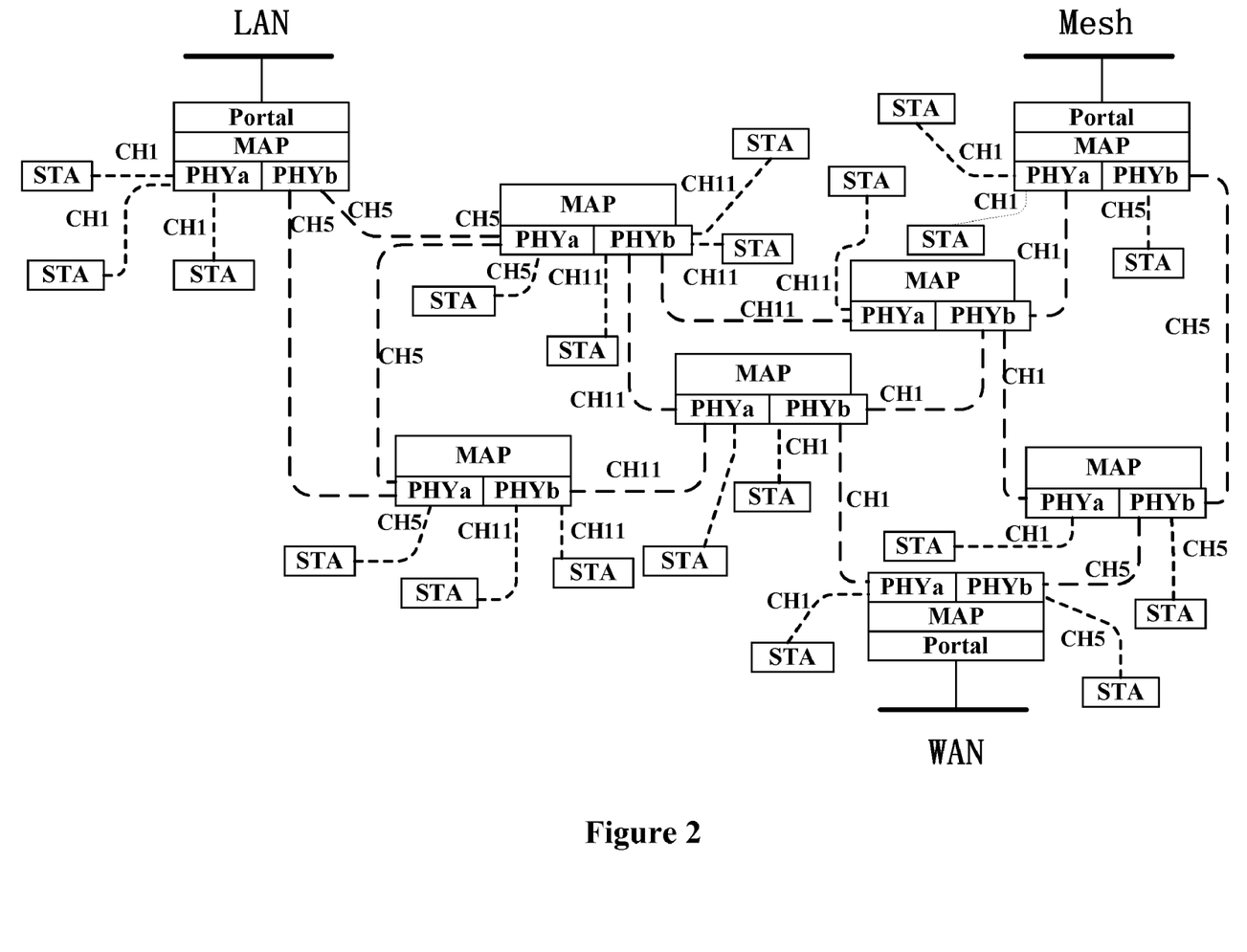
FIG. 2 is a schematic diagram illustrating the whole architecture of the mesh network according to various embodiments.

FIG. 2 is a schematic diagram illustrating the whole architecture of the mesh network according to various embodiments. In FIG. 2, the respective access points MAPs each provide an access for the nodes STAs in the existing mode, such as via the 802.11 standard series. The MAP may each have multiple physical interfaces with multiple different frequency bands, such as PHYa and PHYb. Therefore, air-interface connections between the MAP and the other MAPs or between the MAP and the STA to which the MAP belongs can be established using channels with different frequency bands, and the MAPs which are internally inter-connected via a Wireless Distribution System (WDS) can move within a range. If having an interface (Portal) for connection with an external network, a MAP can be connected with various different networks via the interface Portal, to provide a network egress for other nodes in the mesh network (STAs or MAPs). It may be possible that in one mesh network multiple MAPs are provided with such an interface.

In FIG. 2, MAP denotes Mesh Access Point; MAPP denotes Mesh Point with active Portal, i.e. Mesh Access Point with a portal; STA denotes Client Station, i.e. mobile node or device node; CH denotes Wireless Channel with different frequency bands, such as CH1, CH5 and CH11; thick dashed lines denote WDS Links; thin dashed lines denote conventional 802.11 BSS wireless links.

Various embodiments for the routing method are described as follows in detail:

All mobile stations STAs do not take part in the route updating, and only each MAP in the mesh network exchanges link information with neighbor node MAPs via a routing protocol, such as RIPv2 routing protocol, so as to get the backbone topology structure of the whole mesh network, i.e., the connection relations of the MAPs in the whole wireless local-area network. Also, a weight is allocated for each link according to parameter options, and a routing table is ultimately created by a route computation via the Djikstra shortest path algorithm. If a link changes, the MAPs can rapidly update the link information between each other to get the latest network topology structure and compute a new routing table. In other words, the topology structure and the routing table for the backbone MAPs are implemented via a simple routing protocol.

Figure 3:
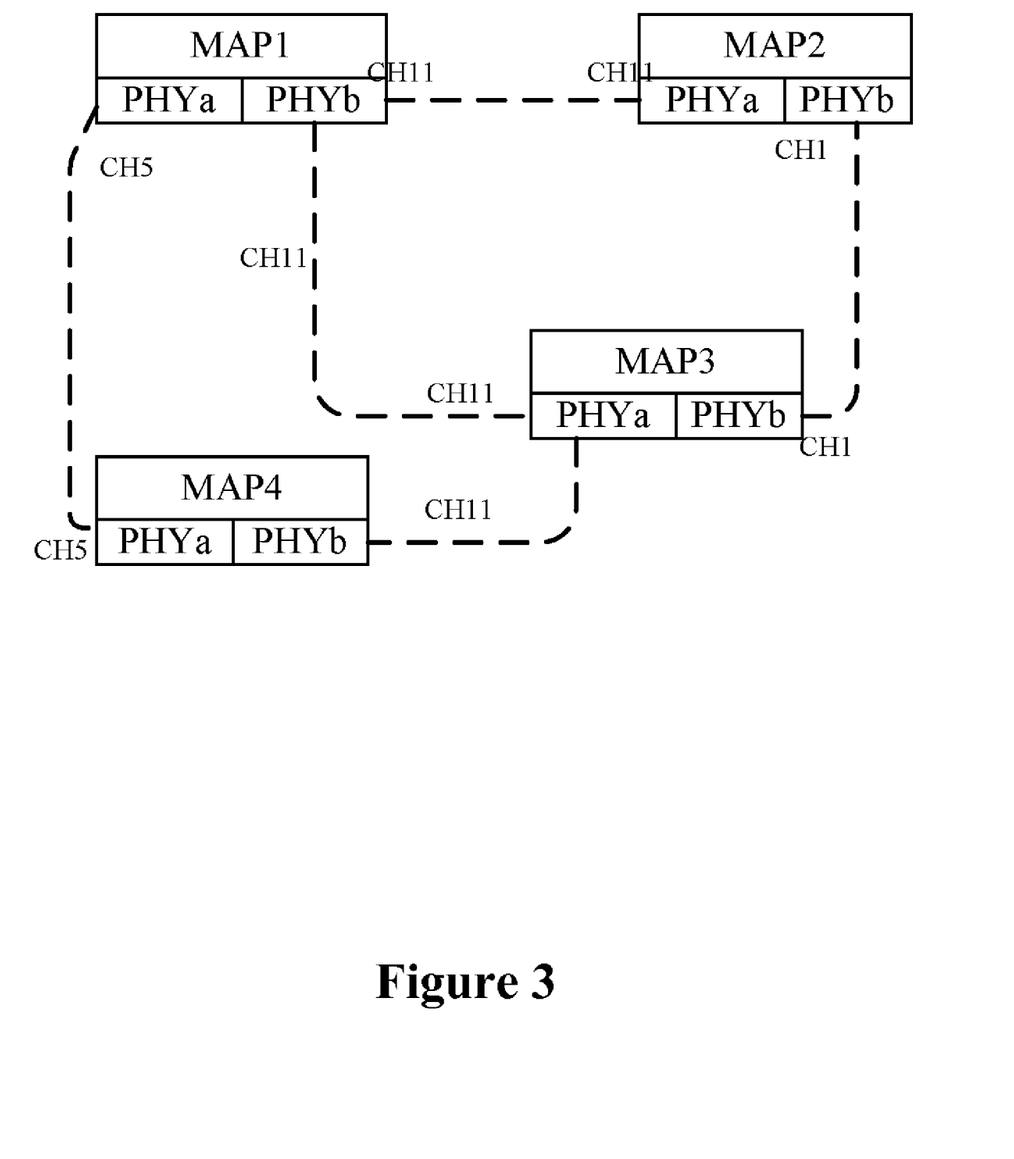
FIG. 3 is a schematic diagram illustrating the topology structure of another mesh network according to embodiments.

FIG. 3 is a schematic diagram illustrating the topology structure of the mesh network according to various embodiments. Table 1 is a topology structure table corresponding to the embodiments. In table 1, "Link Entity xy" denotes the link from node x (MAP x) to node y (MAP y). For example, Link Entity 12 denotes the link from MAP 1 to MAP 2 as illustrated in FIG. 2.

TABLE 1

Topology Structure Table of the Mesh Network

| Mesh access point | MAP1 | MAP2 | MAP3 | MAP4 |
|---|---|---|---|---|
| MAP1 | | Link entity 12 | Link entity 13 | Link entity 14 |
| MAP2 | Link entity 21 | | Link entity 23 | |
| MAP3 | Link entity 31 | Link entity 32 | | Link entity 34 |
| MAP4 | Link entity 41 | | Link entity 43 | |

According to the topology structure of the mesh network and the shortest path algorithm, each MAP computes an optimal route to other MAPs and creates a routing table, whose items mainly consist of destination MAC address, address of next-hop MAP, link weight and so on. Table 2 provides the parameter items and their types in a mesh routing table.

TABLE 2

Data Structure for Mesh Network Routing Table

| Data Item | Type |
|---|---|
| MAC address of destination MAP | 48-bit integer |
| MAC address of next-hop MAP | 48-bit integer |
| The number of remaining hops | Integer |
| Link weight | Integer |
| Updated sequence number | Integer |
| Updating time | Integer |

An appropriate MAP is selected from the MAPs in the mesh network to store the Media Access Control (MAC) addresses of all STAs and locations of the MAPs serving these STAs, and serves as a query server to provide the routing information query service. The algorithm for selecting the location query server may be the root bridge selection algorithm for creating tree bridges, or the fixed sequences of MAPs such as the MAP with a Mesh Portal. All of the MAPs store the MAC addresses of the two MAPs which serve as servers for the subsequent location query of the STAs.

In order to improve the system reliability, a backup location query server is set. If the selected primary server fails, the backup query server may be adapted to finish the query task, and a new backup location query server will be selected. If the two servers fail simultaneously, i.e., the MAPs receive no query response from the primary and the backup location query servers within a specified time, the MAP which first detects this failure notifies the whole network of the failures of the two nodes serving as the location query server and the backup location query server, and initiates a request for re-selecting query servers to complete the selection of new location query servers.

Figure 4:
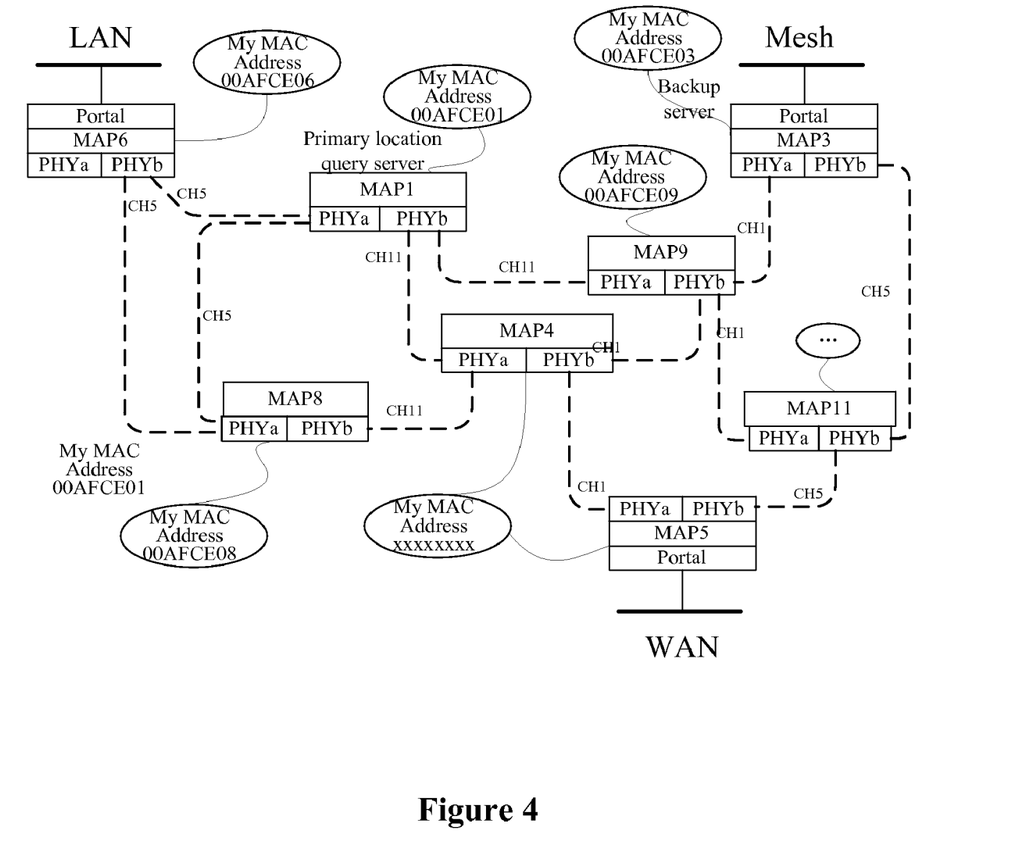
FIG. 4 is a schematic diagram illustrating the process and structure of selecting an STA location query server from MAPs according to various embodiments.

FIG. 4 is a schematic diagram illustrating the process and structure of selecting an STA location query server from MAPs according to various embodiments. In FIG. 4, each MAP broadcasts the minimum MAC address of its multiple physical interfaces. The MAP with the minimum MAC address in the whole network serves as the STA location query server, and the MAP with the secondary minimum MAC address in the whole network serves as the backup STA location query server.

When accessing a physical interface of a MAP, a mobile node STA registers its MAC address. The MAP registers the MAC address of the connected STA and the MAC address of the physical interface corresponding to the STA with the primary and backup location query servers, so that the STA location query servers store the corresponding relations between all of the STAs and the MAPs serving the STAs in the current mesh network to form an STA location table.

Figure 5:
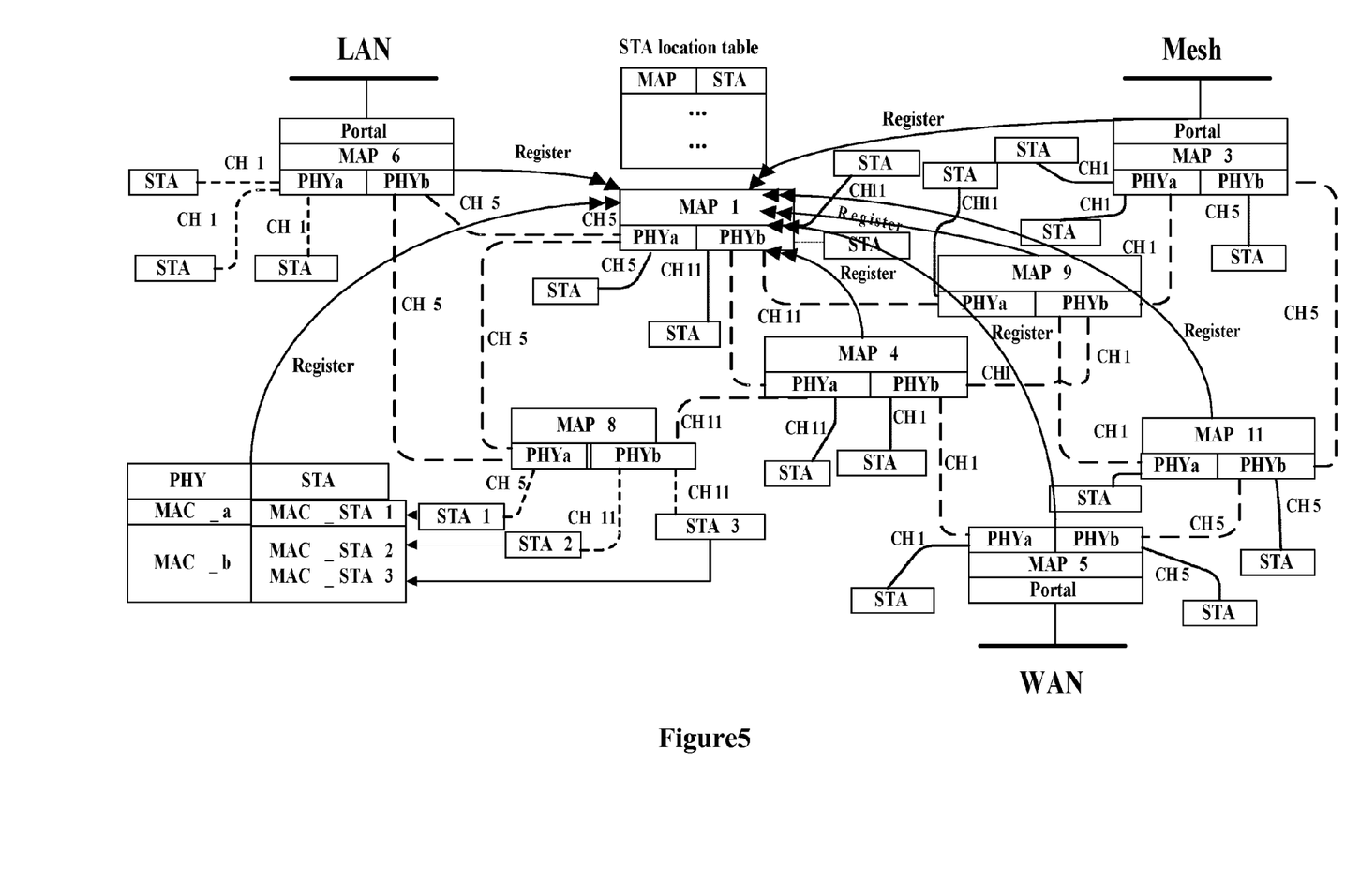
FIG. 5 is a schematic diagram illustrating the registration processes for a mobile node STA and the MAP serving the STA according to various embodiments.

FIG. 5 illustrates the registration process of the corresponding relation between the STA and its MAP. When an STA needs to transmit data, the MAP serving the STA queries for the MAP where the destination STA is in its recorded primary and backup location query servers. The STA location query servers each store the information in an STA location table for query.

When needing to transmit data to a destination STA, any STA writes its own MAC address and the MAC address of the destination STA respectively into the source STA address field and the destination STA address field of a data packet, and delivers the data packet to the MAP serving the STA. If the MAP finds that the MAC address of the destination STA is not within the access range of any of its own physical interfaces, the MAP performs a query in the STA location query server(s) for the MAP serving the destination STA. The location query server(s) then respond(s) to the requestor with the MAC address of the MAP serving the destination STA. Next, the MAP places the MAC address of the destination MAP and its own MAC address respectively in the destination and source MAP address fields of the data packet, and the routing is performed according to the MAC address of the destination MAP and the routing table. On receiving the data packet, the destination MAP directly distributes the data packet to the STAs within its access range.

The MAP serving the STA transmitting data may buffer previous query results. If the STA transmits data to the same destination node again, the routing and forwarding can be performed directly. However, because of the characteristics of the wireless local-area network, the buffered result may become invalid due to the movement of the destination STA. Therefore, a short buffering time is specified according to the protocol. Once the time expires, the buffered content will be deleted, and another location query for a destination STA will be re-performed for new arriving data to be transmitted.

Figure 6:
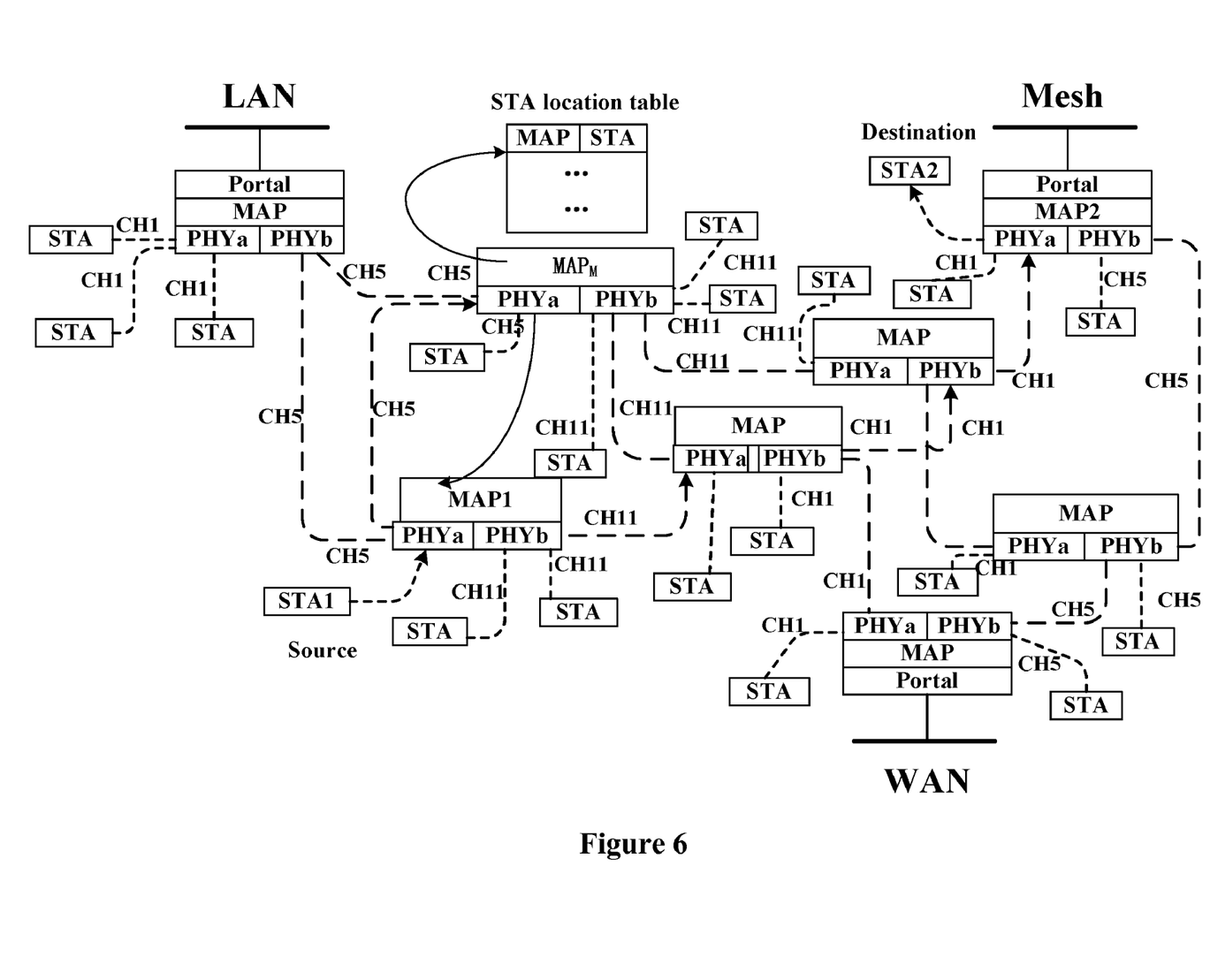
FIG. 6 is a schematic diagram illustrating the processes of destination address query, routing and data transmission.

FIG. 6 illustrates the whole process of transmitting data from an STA to a destination STA, which includes: sending a request, querying for STA location information, route computation, forwarding, and receiving. In FIG. 6, STA1 is the source Station, STA2 is the destination Station, and $MAP_M$ is the location query server. The process includes the following:

STA1 requests to transmit data to STA2.

MAP1 serving STA1 initiates a request of querying for the MAP serving STA2 to the location query server $MAP_M$.

The location query server queries in its location table to get the MAC address of the physical interface PHYa, connected to STA2, of MAP2 serving STA2, and returns the query result to MAP1. MAP1 creates a routing information table, buffers and reserves the routing table for a certain time.

MAP1 forwards the data from STA1 to the corresponding physical interface of MAP2 serving STA2 according to the routing table, and the MAP2 finally forwards the data to STA2.

The above routing process is one of various processes. However, since the movement or the failure of an STA may result in the inconsistency of location relation in the wireless local-area network, various policies are provided to solve the problem.

One various policy is a passive updating policy, i.e. if the corresponding relation between an STA and the MAP serving the STA changes due to the movement of the node, the handover-to MAP serving the STA is responsible for location query in the location query server and updating. The detailed implementing process includes:

During the handover of the mobile node between different MAPs, after the STA completely moves out of the original MAP, the original MAP deregisters the corresponding relation between itself and the STA to the location query server; and, when the STA moves into the coverage area of another MAP, the moved-into destination MAP registers the corresponding relation between itself and the STA with the location query server.

If the STA is not transmitting or receiving data during the handover, the above policy can ensure the normal handover between MAPs;

If the STA is transmitting data, on the basis of the above policy, the original MAP notifies the STA of the handover-to destination MAP, i.e. notify the STA of the address of the destination MAP that the data is being transmitted to.

If the STA is receiving data, on the basis of the above policy, the original MAP notifies the source MAP of the data path on which the data is transmitting of updating the destination of the transmitted data to the handover-to destination MAP. It is possible that one STA is covered by two MAPs during the handover between MAPs. In this case, the STA is simultaneously associated with the two MAPs for a time period, during which the above policy is performed to ensure the continuity and integrity of the transmitted data.

A second various policy is an active updating policy, i.e. if the corresponding relation between an STA and the MAP serving the STA changes due to the failure of the node, the location query sever queries in each MAP for the latest STA corresponding relation actively. The implementing process of the policy includes the following.

The failure of an STA may result in the change of the corresponding relation between the STA and the MAP serving the STA, however, the failure STA can not inform the location query server of the change in a timely manner. Therefore, in various embodiments the location query server is specified to perform an active query for the STA location in each MAP in the mesh network at a predetermined time interval, and to update the corresponding relation table between the STA and the MAP.

The operation can efficiently eliminate the ambiguity of the corresponding location relation resulted from the failure of the node, which is very necessary in such environments with multiple uncertain factors, such as mobile and wireless environments. Further, as long as an appropriate updating time interval is set, the policy does not introduce a large amount of overhead.

Figure 7:
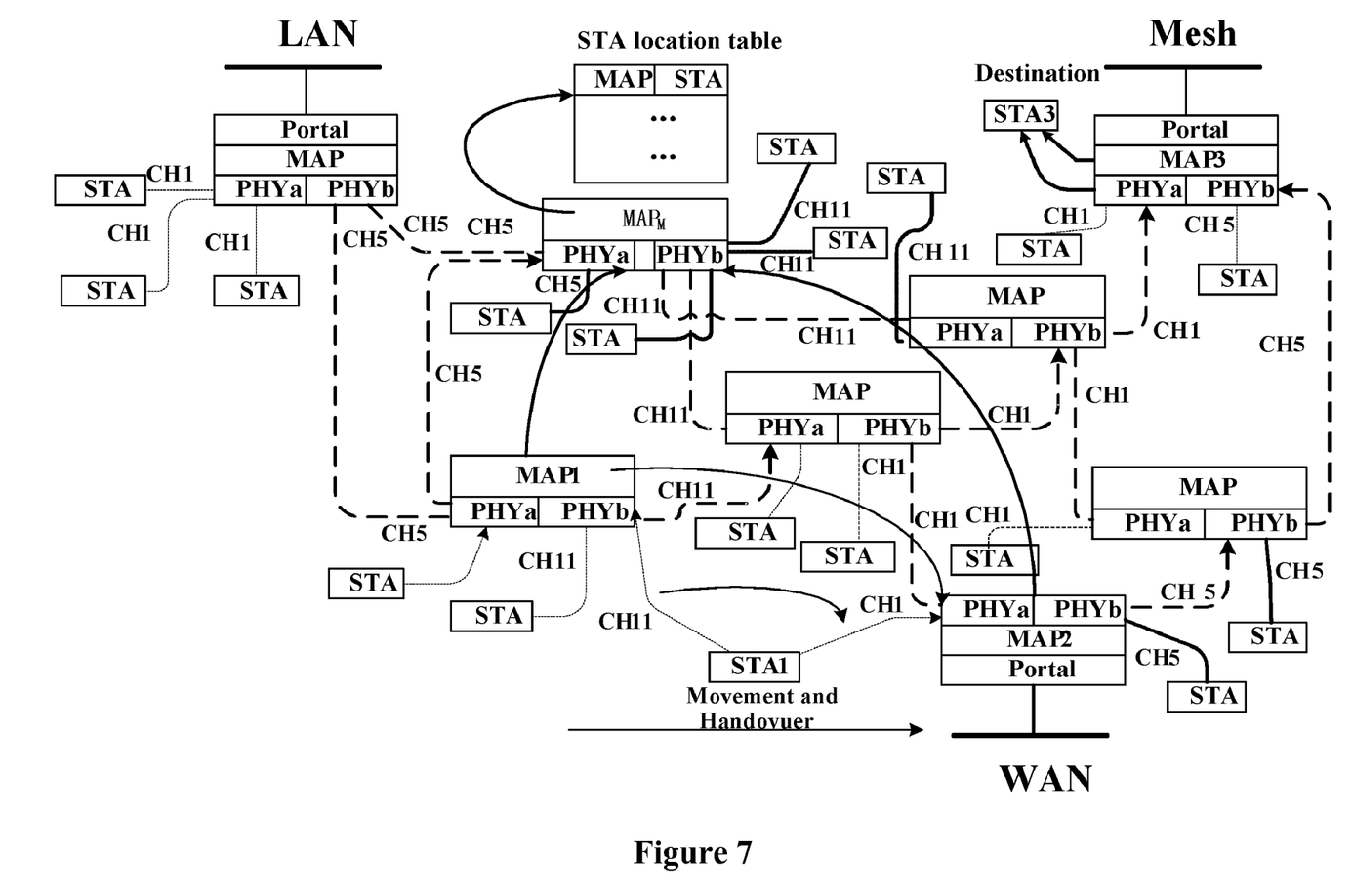
FIG. 7 is a schematic diagram illustrating the process of the mobile STA's handover from the MAP serving the STA and the corresponding data link.

FIG. 7 is a schematic diagram illustrating the handover between MAPs and between data transmission path due to an STA movement in various embodiments. The handover occurs from MAP1 to MAP2, and the data transmission exists between STA1 and STA3. STA1 is the data source, which is transmitting data. The handover process, if STA1 is the destination of the data link, i.e. STA1 is receiving data, is similar to this case, and is not described here in detail.

As illustrated in FIG. 7, the handover of STA1 is from the original MAP1 serving STA1 to a new MAP2 serving STA1. Specifically, the handover destination MAP2 sends a register message to the location query server $MAP_M$, so that STA1 can register with the MAP2; the location query server $MAP_M$ updates the corresponding information in its STA location table; the original MAP1 serving STA1 notifies the handover destination MAP2 of the destination STA3 of the data being transmitted; STA1 hands over the data transmission link during the movement; after the handover, the original MAP1 serving STA1 deregisters the corresponding relation between itself and STA1 with the location query server $MAP_M$. Consequently, the mobile node which is transmitting data can be handed over smoothly.

The STA location query provided by the method according to various embodiments, i.e., the query of MAC address of the MAP serving the STA, may be referred to the DNS query in an IP network. Firstly, the two queries have the same order of magnitude. Specifically, the main data of a DNS request or response is a 32-bit IP address, and the main data of a query request or response is a 48-bit MAC address. Secondly, both queries each require only one query, then the data is transmitted continuously; finally, the protocol has a buffer mechanism similar to that for host files in DNS, except for the updating time interval. Therefore, the practicability of the method can be assures.

As described above, the present teachings combine the centralized and distributed routing ideas in view of the specific architecture of the mesh network. The advantages include that, not only the problem of broadcast storm caused by the AODV routing protocol is addresses, but also it becomes possible that not all the routing tasks have to be completed by the centralized location query site, to solve the bottleneck problem in the centralized routing, and to decrease the probability of single point failure by using the policy of backup of the location query server.

The routing protocol in the various embodiments only implements the updating of backbone node routes in MAPs, and a large amount of trivial query for MAC address of the MAP serving the STA is performed in the centralized location query server. In this manner, the technical solution can be well applied even if the number of the nodes STAs or MAPs increases greatly, which improves the extensibility of the mesh network.

In the various embodiments, the MAPs update the backbone routes by using the general routing protocol, which leads to less items in the MAP routing tables, a low updating frequency of the MAP routing tables, a low bandwidth consumption, and a less overhead; and the STAs and the MAPs serving the STAs are stored in the centralized location query server, the storage is therefore not large since each MAC address has only 48 bits, and less bandwidth is occupied due to the rapid query. Therefore, as a whole, the present teachings can improve the efficiency of the routing protocol in the mesh network.

By using the backup location query server and the timely server selecting algorithm in case of failure, decreases the probability of single point failure of the location query server node to the greatest extent, improves the redundancy of the whole protocol, and ensures the effective survivable protection for routing in the whole mesh network.

The routing method can be adaptive in case of rapid STA movement and frequent handover between MAPs, so that the routing protocol keeps in a high availability. With the active updating policy, the location query server updates its database periodically, so as to efficiently avoid the ambiguity of the relation between an STA and the MAP serving the STA caused by the failure of the STA; with the passive updating policy, the STA performs a register with the location query server and a notification of the data source node MAP in case of moving handover between different MAPs, and makes the STA to be simultaneously connected with two MAPs, thereby ensuring the non-termination of the data link and non-loss of data receiving to improve the availability of the whole routing protocol.

Finally, the query mode for the MAC address of the MAP serving an STA according has the advantages of simplicity and convenience.

The above various embodiments are illustrative, and are not limited to these embodiments. For those ordinary skilled in the art, various variations or equivalents can be made according to the technical ideas and the various embodiments. All the variations or equivalents shall be fallen in the protective scope of the present teachings as defined in the attached claims.

What is claimed is:

1. A method for routing communications to a plurality of mobile nodes in a wireless mesh network, comprising:
   querying, by a mesh access point corresponding to a source mobile node, in a location query server for a mesh access point corresponding to a destination mobile node; and
   performing, by the mesh access point corresponding to the source mobile node, routing according to a network topology structure of the wireless mesh network, if the source mobile node needs to transmit data,
   wherein the location query server is one of the mesh access points and stores the corresponding relations between all of the mobile nodes and the mesh access points serving the mobile nodes in the wireless mesh network to form a location table, and
   wherein querying, by a mesh access point corresponding to a source mobile node in a location query server for a mesh access point corresponding to a destination mobile node comprises: if the mesh access point corresponding to a source mobile node finds that the MAC address of the destination mobile node is not within its access range, the mesh access point corresponding to a source mobile node performs a query in the location query server for the mesh access point corresponding to a destination mobile node; wherein the mesh access point corresponding to a source mobile node stores the MAC address of the mesh access point serving as the location query server.

2. The method according to claim 1, wherein a backup location query server is set, and location tables are set respectively in a primary location query server and the backup location query server.

3. The method according to claim 2, further comprising: performing the location query by the backup location query server, and re-determining a new backup location query server from the mesh access points, if the primary location query server fails.

4. The method according to claim 2, further comprising: notifying, by the mesh access point which first receives no query response from the primary location query server and the backup location query server within a predetermined time, the failures of the primary location query server and the backup location query server of the whole network, and initiating a request for re-selecting a location query server, if both the primary location query server and the backup location query server fail.

5. The method according to claim 2, wherein the primary and backup location query servers are the mesh access points with the minimum and secondary minimum media access control addresses in the network respectively.

6. The method according to claim 2, wherein the primary and backup location query servers are mesh access points in a fixed sequence.

7. The method according to claim 1, further comprising: establishing backbone routes and the network topology between mesh access points firstly.

8. The method according to claim 7, further comprising:
deregistering the corresponding relation between itself and the mobile node with the location query server by the original mesh access point, after the mobile node completely moves out of the coverage area of the original mesh access point; and
after the mobile node moves into the coverage area of another mesh access point, registering the corresponding relation between itself and the mobile station with the location query server by the moved-to mesh access point.

9. The method according to claim 7, wherein the mobile node is connected with two mesh access points concurrently, if the mobile node belongs to the two mesh access points.

10. The method according to claim 7, further comprising:
notifying, by the original mesh access point, the handover-to mesh access point of the original destination mesh access point of the transmitted data, if the mobile node is transmitting data; and
notifying, by the original mesh access point, the handover-to mesh access point of address information of the mesh access point acting as the source of the received data, if the mobile node is receiving data.

11. The method according to claim 2, wherein the corresponding location query server queries actively the corresponding relation between the respective mesh access points and their corresponding mobile nodes in case of inconsistency of the location relation of the mobile node.

12. A wireless mesh communication system, wherein mobile nodes and mesh access points are connected wirelessly, and the respective mesh access points operate a routing protocol to establish required routes for performing routing by the mesh access point corresponding to the mobile node, the system comprising:
at least one physical interface; and
a location query server, adapted for storing the corresponding relations between all of the mobile nodes and mesh access points serving the mobile nodes in the wireless mesh network,
wherein the location query server is used to query by a first one of the mesh access points corresponding to a source mobile node for a second one of the mesh access points corresponding to a destination mobile node, and
wherein querying by a first one of the mesh access points corresponding to a source mobile node for a second one of the mesh access points corresponding to a destination mobile node comprises: if the first one of the mesh access points corresponding to a source mobile node finds that the MAC address of the destination mobile node is not within its access range, the first one of the mesh access points corresponding to a source mobile node performs a query in the location query server for the second one of the mesh access points corresponding to a destination mobile node; wherein the first one of the mesh access points corresponding to a source mobile node stores the MAC address of the mesh access point serving as the location query server.

13. The system according to claim 12, wherein the location query server is one of the mesh access points.

14. The system according to claim 12, wherein each of the mesh access points is provided with two physical interfaces, and is connected with the mobile nodes which belongs to the mesh access point or a neighbor mesh access point via different channels.

15. The method according to claim 1, wherein the mobile node is in direct communication with the corresponding mesh access point.

16. The method according to claim 1, wherein the wireless mesh network is not a home network for at least some of: the mobile node and the other mobile nodes.

17. The system according to claim 12, wherein the mobile node is in direct communication with the corresponding mesh access point.

* * * * *